Oct. 16, 1928.
O. HINZ ET AL
1,688,079
MULTIPLE ICE CREAM DISHER
Filed April 27, 1927
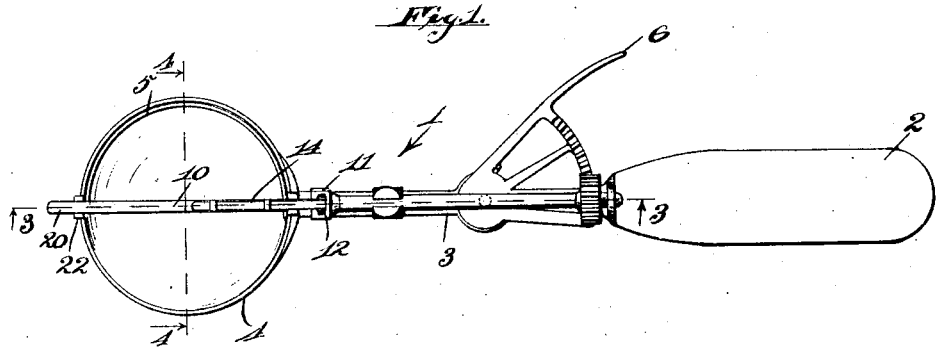
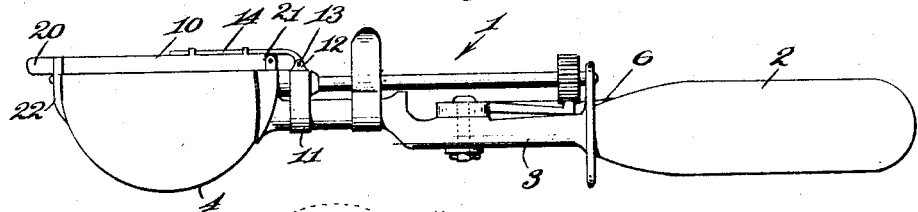
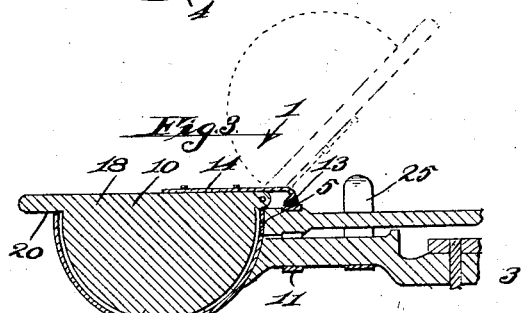
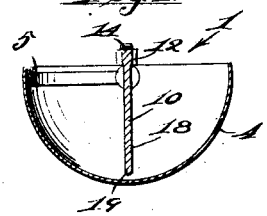
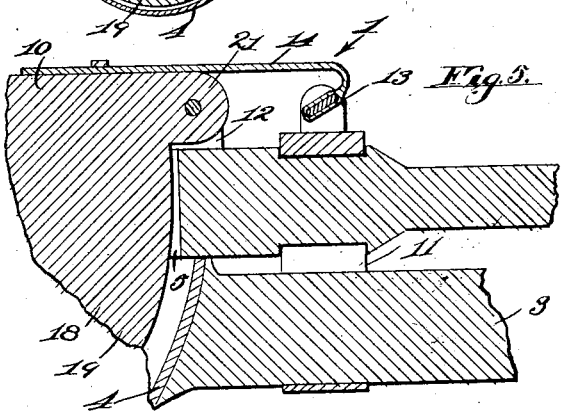

Patented Oct. 16, 1928.

1,688,079

UNITED STATES PATENT OFFICE.

OTTO HINZ AND RUSSELL MERRELL, OF LOS ANGELES, CALIFORNIA.

MULTIPLE ICE-CREAM DISHER.

Application filed April 27, 1927. Serial No. 186,919.

This invention relates to multiple ice cream dishers, and more particularly to an improvement in ice cream dishers which will enable the operator to fill the conventional type of scoop employed in dishing ice cream with ice cream of two or more flavors, and which will enable him to dispense the same into a plate or upon a cone.

A further object of the invention is to provide an ice cream disher in which there is a hinged partition that divides the scoop into two or more compartments and separates the various varieties of ice cream from each other so that when the same is finally dispensed upon the plate or on the cone, the ice cream thus dispensed will show an even line of division between the various flavors of cream.

A still further object of this invention is to provide a scoop which is neat in its appearance, efficient in its operation, inexpensive to manufacture and is well adapted to perform the services required of it.

With these and many other objects in view which will more readily appear as the nature of the invention is better understood, the same consists in the novel construction, combination and arrangement of parts, which will hereinafter be more fully described, illustrated and claimed.

The essential features of the invention involved in the carrying out of the objects indicated are susceptible to modification; but a preferred embodiment of the invention is shown in the accompanying drawings, in which:

Figure 1 is a top plan view of an ice cream disher embodying the principles of our invention.

Fig. 2 is a side elevation of the showing in Figure 1.

Fig. 3 is a sectional view taken substantially along the lines 3—3 of Figure 1.

Fig. 4 is a sectional view taken substantially along the lines 4—4 of Figure 1.

Fig. 5 is a detailed view in section greatly enlarged, showing the manner in which the partition for dividing the ice cream, is mounted.

Similar characters of reference are employed in all of the above views to indicate corresponding parts, and the improved ice cream disher is designated as an entirety at 1, and comprises a handle 2 having a shank 3, to which shank is attached a scoop 4 of conventional design being in the form of a hollow hemispheroid open at the top. Pivotally mounted within the scoop 4, is a cream releasing element 5 operated by a thumb-rack 6.

The above mentioned elements are purely conventional, and no claim is laid as to their novelty. The invention in this case consists in providing a central partition 10 across the scoop 4. A small strap 11 which is hinged to an operative part of the dispensing mechanism, comprises a part of the conventional type of scoop. In constructing our device, we prefer to form a small lug 12 on the upper portion of this strap, which lug supports a flat pin 13. A strip of resilient material 14 is attached to this flat pin 13, which piece of material normally tends to occupy a position shown in the dotted lines of Figure 3, but under stress may occupy a position shown in full lines in Figure 3. Secured to this strip by welding, soldering, riveting or in any suitable manner, is a division plate 18, which plate has a depending portion 19 having the contour of a semi-circle. A pair of lugs 20 and 21 formed on this division plate are adapted to bear against the upper periphery of the scoop, and the depending portion 19 is of sufficient depth as to just clear the bottom of the scoop and permit the cream releasing element 5 to pass between the bowl and the same. A bifurcated snap shown at 22 serves to releasably hold the lug 20 between its jaws against the action of the resiliency of the strip 14. This lug 20 projects a considerable distance beyond the marginal edge of the scoop, and a slight tap of the same upon an object will serve to release the lug from the bifurcated jaws. Upon releasing the same the resilient action of the strip 14 will throw the strip and partition member 19 upwardly and rearwardly until the same is caught between the bifurcated jaws of a second snap 25, where the same is releasably held until manually removed.

From the foregoing, it is thought that the construction, use and many advantages of the hereindescribed multiple ice cream disher will be readily apparent without further description, and it will also be understood that changes in the form, proportion and minor details of construction may be resorted to without departing from the spirit of the invention or sacrificing any of the advantages thereof.

We claim:

1. The combination with a scoop having a bowl, a handle and a releasing element mounted upon said scoop for movement in said bowl, of a central partition carried by said scoop to divide the bowl into two compartments, said partition being slightly spaced from the bowl of said scoop, and means for forcibly ejecting said partition from said scoop for the purpose specified.

2. The combination with a scoop having a handle and a releasing element, of a resilient strip, one end of which is attached to a stationary point, a partition attached to said strip, said partition having a depending portion having a contour similar to the contour of a cross section of said scoop, a projecting lug on said partition, a bifurcation on said scoop engaging said projecting lug, said resilient strip tending to normally occupy a position that will cause said partition to be removed from said scoop, and a clip adjacent said scoop adapted to receive said partition and releasably hold the same against the action of the said resilient strip.

3. The combination with a scoop having a bowl, a handle and a releasing element mounted for movement within said bowl, of a strip mounted upon the handle adjacent the bowl, a partition carried by said strip, said strip being movable to optionally permit the partition to extend into the bowl or be withdrawn therefrom, resilient means urging said strip and partition to withdrawn position, and means for locking said partition within the bowl.

4. The combination with a scoop having a handle and an element adapted to release the contents of said scoop, of a partition mounted on the rim of said scoop and extending thereinto, the inner edge of said partition being spaced from the interior of the scoop.

5. The combination with a scoop having a bowl, a handle and a releasing element mounted for movement within the bowl, of a strip extending across the top of said bowl, and a partition depending from said strip into said bowl, the inner edge of said partition being spaced from the interior surface of the bowl to permit the releasing element to pass therebetween.

6. A device of the character described, comprising an open scoop and a partition pivotally mounted on the rim of said scoop for movement optionally out of or into the scoop to present either a single open compartment or a plurality of open compartments.

7. A device of the character described comprising a hollow hemispheroidal scoop and a partition mounted thereon and movable into or out of the scoop in a plane perpendicular to the plane of the open side of the scoop.

In testimony wherof we have signed our names to this specification.

OTTO HINZ.
RUSSELL MERRELL.